3,697,294
PROCESS FOR PRODUCING A BAKERY FAT
PRODUCT WITH IMPROVED ABILITY TO
RETARD THE STALING OF BREAD
Ulo Riiner, Asarum, Sweden, assignor to AB Karlshamns
Oljefabriker, Karlshamn, Sweden
No Drawing. Continuation-in-part of application Ser. No. 761,395, Sept. 16, 1968, now abandoned. This application Jan. 20, 1971, Ser. No. 108,156
Claims priority, application Sweden, Sept. 18, 1967, 12,810/67
Int. Cl. A23d 5/00
U.S. Cl. 99—123    3 Claims

ABSTRACT OF THE DISCLOSURE

A process for producing a bakery fat emulsion with the ability of retarding the staling of bread, comprising the steps of (1) preparing a dispersion of mainly 1-monoglyceryl esters of saturated fatty acids, containing 14 to 22 carbon atoms, in water and (2) emulsifying said dispersion into an edible fat component forming the continuous phase of the bakery fat emulsion.

---

This application is a continuation-in-part of my application Ser. No. 761,395, filed Sept. 16, 1968 and now abandoned.

This invention relates to a process for producing a fat product containing a water phase as a dispersed phase, such as a bakery margarine, with exceptional ability to retard the staling of bread.

It has for many years been known that certain surface-active fatty acid derivatives, especially partial esters of saturated fatty acids of polyfunctional alcohols, e.g. 1-monoglyceryl esters, have the ability of retarding the retrogradation of starch in bakery products. As a rule these substances have hitherto been melted together with fat and the resulting liquid has been used in the well known procedures for mixing, cooling, mechanical working and tempering that is applied in the production of fat products used in baking, e.g. shortenings. When a sufficiently high percentage of surface-active lipids has been present, the products have been given special conventional names such as "high ratio shortening."

The preparation of mixtures of water and monoglyceryl esters of saturated fatty acids, e.g. 1-monoglyceryl-stearate, has been described thoroughly in the literature. The resulting properties of such mixtures lie in between the crystalline and liquid states, depending on the conditions of preparation, and the main use has been in whipped products.

The dispersing of such monoglyceryl esters in water at a temperature below their melting points can, within certain ranges of concentration and conditions, lead to hydrophilization of the solid ester structure. Such dispersions have achieved some use in the bakery technology.

In this invention, however, it has been discovered that the use of monoglyceryl ester dispersions in water, as described above, as the dispersed phase in a fat emulsion, e.g. a bakery margarine, has a considerably greater efficiency in the power of retarding the staling of bread than has the incorporation of monoglyceryl esters in the fat phase or the use of water dispersions as such.

This invention provides a process for producing a bakery fat emulsion, e.g. a bakery margarine, with the ability of retarding the staling of bread, comprising the steps of preparing at a temperature within the range from 55° C. to 68° C. a dispersion constituting 5–45% by weight of mainly 1-monoglyceryl esters of saturated fatty acids, containing 14–22 carbon atoms, in 95–55% by weight water, and of emulsifying said dispersion into an edible fat component for forming a fat emulsion of 40–90% fat and 60–10% dispersion in which said dispersion forms the dispersed phase and said fat component forms the continuous phase.

The invention also comprises a bakery fat emulsion of the water-in-oil type with the ability of retarding the staling of bread, formed in accordance with the process of the invention.

The effect achieved by the invention depends on a greater part of the active components being brought into the system of hydrophile carbohydrate chains of the starch. The monoglyceryl esters already in the water phase are in a hydrophile state and the continuous fat phase functions as a carrier of a great number of droplets of a concentrated dispersion of monoglyceryl esters in water. At the direct addition of the dispersion to the dough water a dilution of the monoglyceryl esters takes place approximately in a ratio of 1:20, whereby a correspondingly greater part will remain as a dispersion in the water phase and will not be worked into contact with the flour constituents at the dough making.

It is suitable that the 1-monoglyceryl esters of the saturated fatty acids are constituted mainly of 1-monoglyceryl stearate and/or 1-monoglyceryl palmitate.

The bakery fat emulsion, e.g. the bakery margarine, prepared according to the invention is specially advantageous for use in the manufacture of baked products of wheat flour, where an exceptionally great retardation of the bread staling is achieved. Similar advantages can, however, also be achieved at the production of other baked products.

EXAMPLE 1

A bakery fat emulsion is prepared of a fat phase and a water phase in such a manner that the fat phase will constitute the continuous phase and the water phase the dispersed phase. The above mentioned water phase is formed by a dispersion in water of surface-active, edible lipids.

WATER PHASE

|  | Parts by weight |
| --- | --- |
| 1-monoglyceryl stearate | 19.0 |
| Sodium chloride | 4.8 |
| Sodium benzoate | 0.2 |
| Propionic acid | 0.5 |
| Water | 75.5 |
|  | 100.0 |

Water of 60° C.+1-monoglyceryl stearate+sodium chloride are mixed and are passed into agitators until the 1-monoglyceryl stearate is completely dispersed. During the agitation the mixture is carefully heated to 63–64° C. Dispersion time 1–2 hours depending on the grain size of the 1-monoglyceryl stearate. The propionic acid is added when the dispersion is finished and immediately before pumping the fat phase into the dispersion container.

Fat phase.—Fat blend for bakery margarine with addition of flavoring agent, food coloring, lecithin and vitamins.

A bakery fat emulsion in the form of a margarine is prepared in the usual manner by dispersing 18 parts by weight of the above mentioned water phase into 82 parts by weight of the above mentioned fat phase (at about 40° C.), whereby an emulsion is obtained. This emulsion is cooled and packed in the usual manner.

EXAMPLE 2

Baking experiments were carried out in accordance with the following recipe:

| | Parts by weight |
|---|---|
| Wheat-flour | 100.0 |
| Water | 43.5 |
| Bakery fat | 17.4 |
| Sugar | 17.4 |
| Yeast | 4.3 |
| Powdered milk | 4.3 |

The dough was made and worked under the following conditions: Dough temperature 28° C., yeast temperature 36° C., oven temperature 220° C., stay time 60 min., yeast times 40, 45 and 50 min., baking time 20 min. The baking was made in baking-tins holding 400 g. dough.

In the experiments the bakery fat emulsion according to Example 1 was compared with the following alternative bakery fats:

Experiment A.—As a bakery fat a traditional bakery margarine was used, having a fat content of 82% by weight and the dispersed phase constituting 18% by weight and having the following compositions: water 75.2% by weight, skim-milk 20.0% by weight, sodium chloride 4.8% by weight.

Experiment B.—As a bakery fat the same bakery margarine was used as in Experiment A, but 3.13 parts by weight of the water for the dough were replaced by an equal amount of dispersion, prepared according to Example 1.

Experiment C.—As a bakery fat the same bakery margarine as in Experiment A, but 4% by weight of the fat component was replaced by glyceryl monostearate which was melted together with the fat.

Experiment D.—As a bakery fat a bakery margarine prepared according to Example 1 was used.

The hardness of the bread was measured in a so-called panimeter 24, 72 and 120 hours after the baking was finished. The panimeter value is a penetration measure which is indicated in sec./mm. (impression) and gives a measure of the relative hardness of the bread. Results:

| Experiment | Panimeter value (relative scale) | | |
|---|---|---|---|
| | 24 hrs | 48 hrs | 120 hrs |
| A | 13.9 | 19.7 | 26.7 |
| B | 11.4 | 16.1 | 21.5 |
| C | 11.8 | 15.2 | 20.7 |
| D | 10.2 | 13.0 | 16.5 |

The results show that the bakery fat emulsion according to Example 1 has a superior ability to retard the staling of bread. It appears that bread baked with a bakery emulsion according to the invention shows the same hardness after 48 hours as bread baked with a traditional margarine shows after 24 hours, and that bread baked with a bakery emulsion according to the invention shows as good properties after 120 hours as bread baked with monoglyceryl ester additive according to the prior art, after 48 hours.

EXAMPLE 3

Similar results are obtained when the 1-monoglyceryl stearate in Examples 1 and 2 are replaced by or used in mixture with 1-monoglyceryl palmitate or other partial esters of a polyfunctional alcohol with saturated fatty acids containing 14–22 carbon atoms.

What I claim and desire to secure by Letters Patent is:

1. A process for producing a bakery fat emulsion with the ability of retarding the staling of bread, comprising the steps of preparing at a temperature within the range from 55° C. to 68° C. a dispersion constituting 5–45% by weight of mainly 1-monoglyceryl esters of saturated fatty acids, containing 14–22 carbon atoms, in 95–55% by weight water, and of emulsifying said dispersion into an edible fat component for forming a fat emulsion of 40–90% fat and 60–10% dispersion in which said dispersion forms the dispersed phase and said fat component forms the continuous phase.

2. A process according to claim 1, in which said 1-monoglyceryl esters are mainly constituted of at least one member of the group consisting of 1-monoglyceryl stearate and 1-monoglyceryl palmitate.

3. A bakery fat emulsion of the water-in-oil type with the ability of retarding the staling of bread, formed in accordance with the process of claim 1.

References Cited

UNITED STATES PATENTS

| 1,917,254 | 7/1933 | Harris | 99—123 |
| 2,223,558 | 12/1940 | Epstein | 99—123 |
| 2,508,393 | 5/1950 | Jaeger | 99—123 |
| 3,216,829 | 11/1965 | Hansen | 99—123 X |

FOREIGN PATENTS

| 953,601 | 3/1964 | Great Britain | 99—123 |

JOSEPH M. GOLIAN, Primary Examiner

U.S. Cl. X.R.

99—118 R, 91